Sept. 20, 1966 M. SILBER 3,274,346

AUTOMATIC TELEPHONE DIALING APPARATUS

Original Filed Nov. 29, 1961 2 Sheets-Sheet 1

MAURICE SILBER
INVENTOR.

BY Allan M. Shapiro

ATTORNEY

AUTOMATIC TELEPHONE DIALING APPARATUS

Original Filed Nov. 29, 1961 2 Sheets-Sheet 2

MAURICE SILBER
INVENTOR.

BY Allan M. Shapiro

ATTORNEY

United States Patent Office 3,274,346

Patented Sept. 20, 1966

3,274,346

AUTOMATIC TELEPHONE DIALING APPARATUS

Maurice Silber, 16129 Tupper Ave., Los Angeles, Calif.

Continuation of application Ser. No. 155,609, Nov. 29, 1961. This application Aug. 5, 1965, Ser. No. 480,544
7 Claims. (Cl. 179—90)

This application is a continuation of application Serial No. 155,609, filed November 29, 1961, now abandoned.

This invention relates generally to an automatic telephone dialing apparatus, and more particularly to a system and apparatus for use in conjunction with conventional dial telephones for automatically successively dialing and delivering a prerecorded message to each of a plurality of predesignated telephone numbers.

Recent investigations suggest that personal contact by telephone represents an effective technique for disseminating information to large numbers of people concerning, for example, the solicitation of contributions for charities, solicitation of votes in political campaigns, and notification of merchandise sales, etc. Although this communication technique is recognized as being extremely effective, it has the disadvantage of being relatively expensive inasmuch as heretofore large staffs of people have been required to individually dial the telephone number of each person whom it is desired to contact. In view of this great expense, efforts have been made to develop semi automatic and automatic equipment for dialing the telephone numbers desired. To a great extent these efforts have failed inasmuch as all of the equipments developed have been relatively complex and expensive, and in addition most of them require modification of the telephone in order to accomplish the task. Due to the lack of adequate equipment for inexpensively and automatically dialing telephones and delivering a prerecorded message, relatively little use is made of the telephone as a medium for disseminating information. Rather, potential advertisers and solicitors rely on radio, television, newspapers, and distributed handbills. It is thought however that, upon the development of improved equipment for use with telephones, many advertisers and solicitors would prefer to utilize the telephone inasmuch as the contacts made are of a more personal nature and accordingly are more effective in inducing people to respond to the advertising or soliciting.

Accordingly, it is an object of this invention to provide simpler and less expensive apparatus than heretofore known for performing the function of automatically dialing and delivering a prerecorded message to each of a plurality of predesignated telephone numbers.

It is an additional object of this invention to provide automatic telephone dialing apparatus which can be used in conjunction with conventional dial telephones without requiring any modification thereof.

In accordance with the invention, a plurality of telephone numbers to be dialed are sequentially stored in a convenient code on a medium such as paper or magnetic tape. A reading device successively reads each digit of the coded telephone numbers and controls certain of a first set of switches in accordance with the read digit. A dialing assembly disposed externally to the telephone is coupled to the dial thereof and is capable of rotating the dial. Carried by the dialing assembly is a coded plate adapted to be rotated in fixed relationship with respect to the dial. Means associated with the coded plate control switches of a second set of switches in accordance with the instantaneous rotational position of the plate. The first and second sets of switches are electrically interconnected in such a manner that after the plate is rotated to a position such that a correspondence between the orientation of the first and second sets of switches exists, the dial is released and allowed to rotate back to its initial position thereby effecting the dialing of a digit in the same manner as is done manually. Subsequent to a number of dialings sufficient to constitute the digits of a complete telephone number, operation of an audio playback unit is initiated such that a prerecorded message can be delivered to the transmitting end of the telephone handset and received at the telephone associated with the dialed number.

Other objects and advantages which will become subsequently apparent reside in the details of construction and operation as more fully hereinafter described and claimed, reference now being had to the accompanying drawings forming a part hereof, wherein like numerals refer to like parts through and in which:

Figures 1, 2:
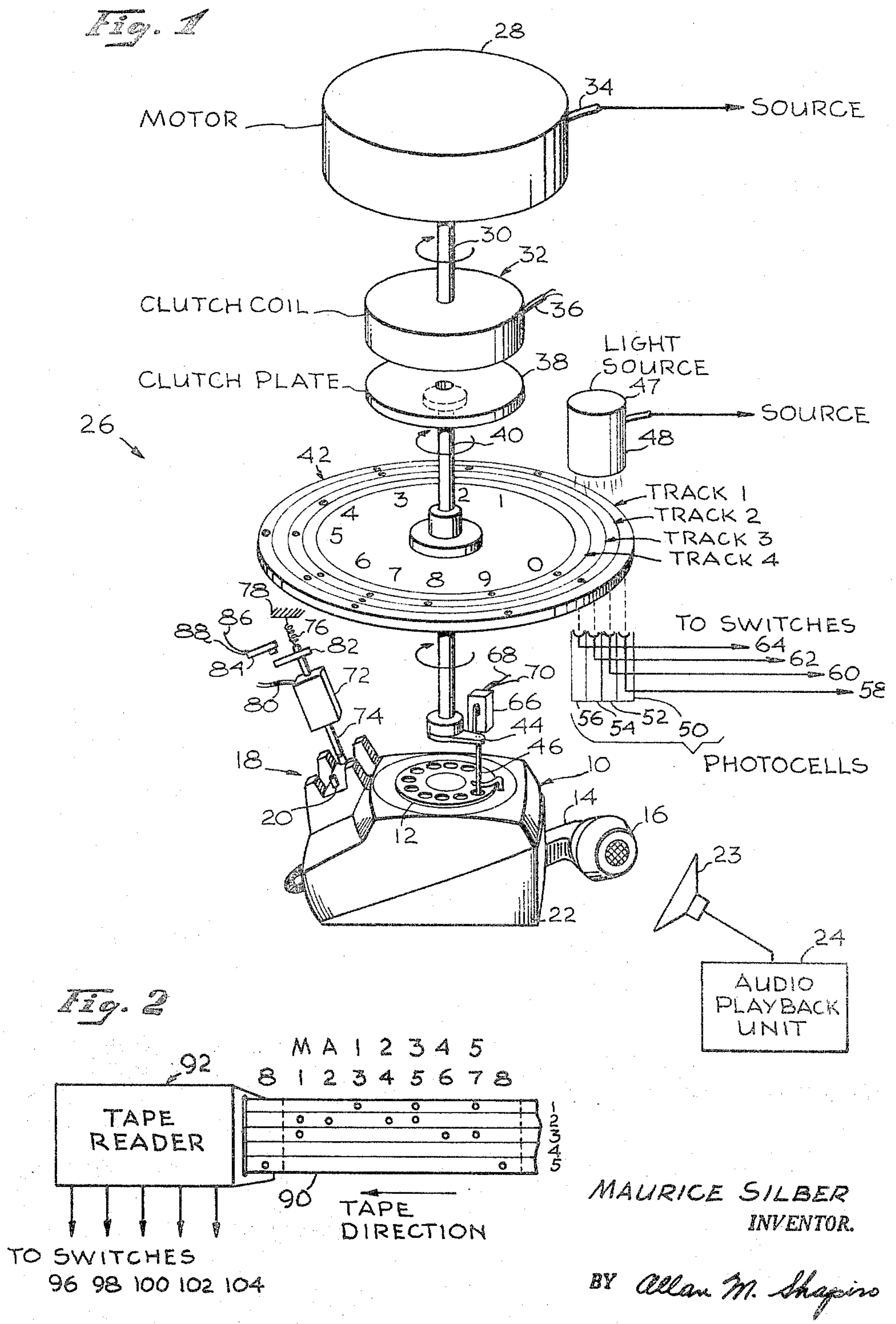
FIGURE 1 is a perspective view of the dialing assembly portion of the invention showing the manner in which it is associated with a conventional dial telephone.
FIGURE 2 is a fragmentary front elevational view of a portion of a storage tape showing one technique for coding an exemplary telephone number, MAin 1–2345.

With continuing reference to the drawings, initial attention is called to FIGURE 1 wherein is illustrated a substantially conventional telephone 10 having a rotatable dial 12, a handset 14 including a transmitting end 16, and a cradle portion 18 for receiving the handset 14 when the telephone is not in use. Disposed in the cradle portion 18 are buttons 20 adapted to be depressed by the handset 14 to thereby open the circuit to the telephone 10. When in use, the handset 14 must be lifted from the cradle 18 so as to release the buttons 20 to thereby close the circuit to the telephone 10. It is desirable to rest the telephone 10 on a base 22 having an oblique upper surface for orienting the dial 12 of the telephone 10 substantially horizontally. The transmitting end 16 of the handset 14 is disposed adjacent the speaker 23 of an audio playback unit 24, preferably a magnetic tape unit, so as to pick up and transmit over the telephone line, a prerecorded message from the playback unit 24. A dialing assembly 26 extends substantially vertically above the telephone dial 12 and comprises a motor 28 having an output shaft to which is rigidly fixed a clutch coil 32. Leads 34 extend from the motor 28 and may be connected to any appropriate source capable of causing the motor 28 to continually rotate. Lead 36 extends from the clutch coil 32 and is connected in the control circuit of FIGURE 3 in a manner to be more specifically described below.

A clutch plate 38, having a shaft 40 fixed thereto, is normally spaced from the clutch coil 32. Carried by the shaft 40 is a coded plate 42 and a radially projecting arm 44. Depending from the arm 44 is a vertical finger 46 which projects into the aperture in the dial 12 positioned over the "0" digit imprinted on the face of the telephone 10, when the dial is in its rest position.

The coded plate 42 defines four distinct annular tracks and ten distinct radial positions. Apertures extend through the plate in the appropriate tracks according to the code for each radial position. An exemplary binary code well suited for the function herein is described by the following table:

TRACK

| Position | #4 | #3 | #2 | #1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |

wherein a binary digit "1" is represented by an aperture in the plate such that, e.g. position #5 is represented by apertures in track #1 and track #3, position #7 is represented by apertures in tracks #1, #2, and #3, etc.

Disposed above the plate 42 and in line with the apertures defined therein is a light source 47 which can be connected through lead 48 to any suitable energizing source. Disposed beneath the plate 42 are photocells 50, 52, 54, and 56 which are aligned respectively with tracks #1, #2, #3, and #4 defined by the plate 42. The photocells respectively control normally closed switches 58, 60, 62, and 64 described below in connection with the circuit of FIGURE 3; i.e., when a photocell is energized, as when an aperture is aligned between a photocell and the light source 46, the switch controlled by the photocell is caused to open.

The dialing assembly 26 additionally includes a normally open switch 66 which is caused to close by engagement with a radially extending arm 44 when dial 12 is in its normal or rest position. When shaft 40 is caused to rotate in the direction of the arrow in FIGURE 1, it carries radial arm 44 out of engagement with switch 66 and permits the switch 66 to open. Switch 66 is coupled through leads 68 and 70 to the control circuit of FIGURE 3 in a manner to be more particularly described below.

Supported above the cradle portion 18 is a solenoid coil 72 controlling the movement of an armature 74 which is disposed in line with one of the buttons 20. A spring 76 is anchored on a first end to support 78 and is connected on a second end to the armature 74 so as to normally hold armature 74 out of engagement with the buttons 20. However, energization of solenoid coil 72 through lead 80 causes armature 74 to engage and depress one of the buttons 20. A projection 82 is carried by armature 74 and is engageable with the actuator of switch 84 when the solenoid coil 72 is not energized. Switch 84 is a normally open impulse type switch and operates by closing only momentarily when its actuator is depressed. Accordingly, it is only when armature 74 is being drawn out of engagement with one of the buttons 20 by spring 76 after deenergization of solenoid coil 72 that switch 84 is momentarily closed. Loads 86 and 88 connect switch 84 in the circuit of FIGURE 3.

Reference is now made to FIGURE 2 wherein a fragmentary portion of a storage tape, here shown as a paper tape 90, is illustrated. The paper tape 90 has telephone numbers coded thereon, the code being discernible by a paper tape reader 92 into which the tape 90 is fed. Within the tape reader 92 is a tape advance solenoid 94 (FIGURE 3) which advances the tape 90 by one position each time it is pulsed. A telephone number, according to the previously indicated code, can be represented on the paper tape 90 by apertures in appropriate tracks therein. For example, assume it is desired that the number MAin 1–2345 be dialed. Extending longitudinally along the tape 90 are tracks #1, #2, #3, #4 and #5. The length of the tape is divided into sections with each section including coded information constituting one telephone number. Eight positions are defined within each section, seven of these positions constituting the digits of a conventional type telephone number and the eighth position constituting an end of number mark. According to the previously suggested code, "M," the first letter of the exchange "MAin," is represented by apertures in tracks #2 and #3 inasmuch as it is identical on the telephone dial to the digit 6. The letter "A," constituting the second letter of the exchange "MAin" on the telephone dial is identical to the digit 2 and accordingly is represented by an aperture in track #2 of the tape. Likewise, the remaining digits of the telephone number are represented on the paper in the manner illustrated in FIGURE 2, according to the code previously described.

The tape reader 92 includes read heads (not shown) associated with each of the tape tracks. Each of the read heads in turn controls the normally open switches 96, 98, 100, 102, and 104 of FIGURE 3 such that when an aperture appears in the appropriate tape track in the digit position under the read head the normally open switch controlled by that read head is caused to close.

Figure 3:
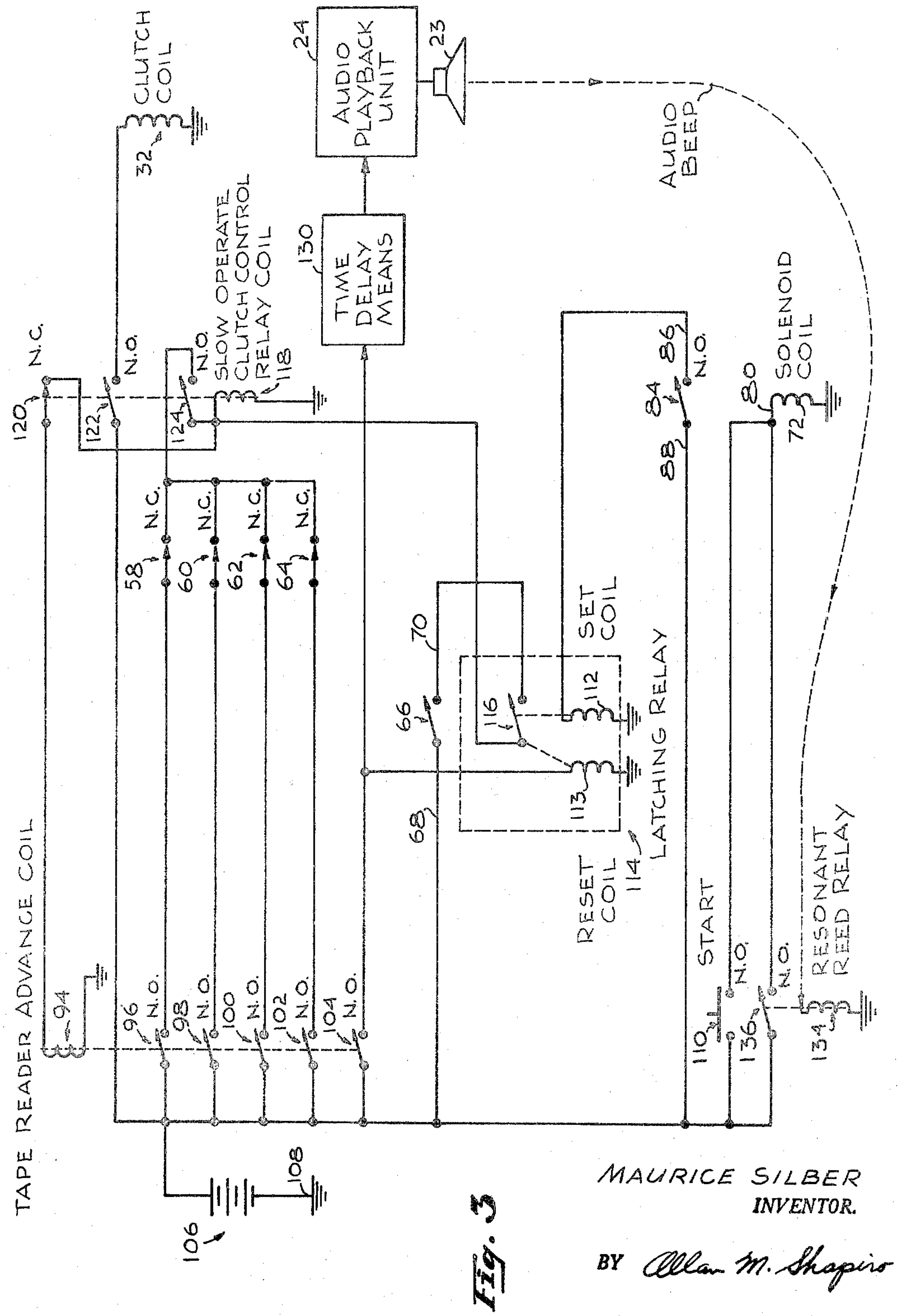
FIGURE 3 is a schematic wiring diagram showing the control circuit utilized to effect the automatic dialing and message delivering sequence.

Attention is now called to the control circuit of FIGURE 3 for a description of the electrical interconnections between the various components mentioned and for an operational explanation of the invention. A D.C. source 106, grounded at terminal 108, is provided. A push button impulse type switch 110 is connected between the source 106 and the solenoid coil 72. Assuming dial 12 is in its rest position, in order to start the dialing sequence, push button switch 110 is manually depressed thereby momentarily energizing solenoid coil 72 and causing armature 74 to depress one of the telephone buttons 20 so as to ready the telephone 10 for dialing. As previously noted, upon deenergization of the solenoid coil 72 switch 84 is momentarily closed and as a consequence thereof "set coil" 112 of latching relay 114 is energized. This in turn closes switch 116 which connects the D.C. source 106 through the closed contacts of switches 66 and 120 to the tape reader tape advance coil 94 causing tape 90 to advance one position with respect to the read head. Assuming that the letter "M" is coded in position #1, the switches 98 and 100 controlled by the read heads associated with tracks #2 and #3 of the tape 90 will close. In addition to this action, when switch 116 closes slow operating clutch control relay coil 118 is energized causing, after a short time delay, normally closed switch 120 to open and normally open switches 122 and 124 to close. Inasmuch as switch 122 is connected between source 106 and clutch coil 32, the clutch coil 32 is energized and consequently draws clutch plate 38 into engagement therewith. As a consequence, shaft 40 is caused to rotate in the direction of the arrow in FIGURE 1 carrying with it coded plate 42 and dial 12. As dial 12 begins to rotate, radial arm 44 moves out of engagement with normally open switch 66 permitting the switch to open. However the clutch control relay coil 118 initially energized through switch 66, remains energized inasmuch as a path to the D.C. source 106 exists through switch 124, and in the present case, the parallel paths constituting switches 60 and 98, and switches 62 and 100. When the shaft 40 rotates sufficiently to carry radial position #6 on the coded plate 42 to a position between the light source 46 and the photocells, photocells 52 and 54 are energized and as a consequence thereof, switches 60 and 62 are caused to open. This action deenergizes relay coil 118 and accordingly switches 122 and 124 open and switch 120 closes. The opening of switch 122 deenergizes clutch coil 32 so as to disengage clutch plate 38 therefrom. The dial is therefore permitted to rotate in a counter clockwise direction to its rest position carrying with it the shaft 40. When the dial returns to its rest position, the radial arm 44 engages the actuator of normally open switch 66 and causes it to close. Inasmuch as the "set coil" of the latching relay 114 is still energized so as to maintain switch 116 closed, the advance coil 94 is again pulsed through closed switches 66 and 120 to cause the tape 90 to advance so that position #2 moves beneath the tape reader read head. Inasmuch as the letter "A" is coded in this position, an aperture appears in tape track #2 and accordingly switch 98 is caused to close. After a short time delay, relay coil 118 causes switch 120 to open and switches 122 and 124 to close. This action energizes clutch coil 32 and rotation of shaft 40 is again initiated consequently permitting switch 66 to open. A path to coil 118 is maintained however through switches 60 and 98. When the coded plate 42 moves to a position such that radial position #2 thereof is between the light source and the photocells, photocell 52 is energized opening switch 60 and again deenergizing relay coil 118 and clutch coil 32.

The above sequence continues until the seven digits constituting the telephone number are dialed. The tape 90 then advances so that position #8 thereof moves beneath the tape reader read head. Consequently, switch 104 controlled by the read head associated with tape #5 closes, coupling the D.C. source 106 through time delay means 130 to the playback unit 24. In a modest system, time delay means 130 may comprise a fixed time delay which serves the purpose of allowing time for the dialed telephone to ring for a desired interval (e.g., three rings) before operation of the playback unit 24 is initiated. In a more sophisticated system, the time delay means 130 could be made responsive to the sound of the ring as heard in the handset of the dialing telephone 10 so that operation of the playback unit 24 is initiated when the ringing stops meaning that a party has answered the dialed telephone. Of course, in order to prevent the system from stalling due to the fact that the dialed telephone may never be answered, a maximum number of rings could be tolerated before the playback unit 24 is caused to operate in any event. As previously pointed out, the speaker 23 of the playback unit 24 is disposed in close proximity to the transmitting end 16 of the handset 14 of the dialing telephone 10.

Inasmuch as it is desired to repeat the same prerecorded message to each number dialed, it is contemplated that the playback unit 24 will utilize an endless tape whose playback operation is repeated for each telephone number. Recorded on the endless tape at the end of the message is an audio beep. A resonant reed relay 134 is responsive to the audio beep and controls switch 136 which is connected between D.C. source 106 and solenoid coil 72. Switch 136 is of the normally open impulse type such that it closes only momentarily upon energization of the resonant reed relay 134. Closure of the switch 136 energizes solenoid coil 72 which causes armature 74 to engage telephone button 20 to again ready the telephone 10 for dialing. It should be noted that when switch 104 closes to initiate operation of the playback unit 24 through the time delay means 130, it also energizes "reset coil" 113 of latching relay 114. This action in turn opened switch 116. However, deenergization of solenoid coil 72 momentarily closes switch 84 to energize "set coil" 112 of latching relay 114 to close switch 116.

Although a preferred embodiment of the invention has been disclosed herein, numerous modifications falling within the true scope of the invention as claimed may occur to those skilled in the art. For example only, in lieu of the light source 47 and photocells 50, 52, 54, 56 used with apertured plate 42, the plate could be provided with projections capable of directly actuating switches 58, 60, 62, 64 which can be disposed immediately adjacent thereto. Alternatively, the plate may be provided with a magnetic coating enabling magnetic recording techniques to be utilized to store the appropriate code thereon. In this latter case of course, the photo cells would be replaced by magnetic read heads. It will in addition also be realized that the four binary code used herein has been chosen for exemplary purposes only innumerable other codes would serve equally as well.

Similarly, the memory device herein described as a paper tape could in fact comprise a disc, drum or any other of several well known memory devices. In addition, the prerecorded message need not be carried on magnetic tape but any means capable of carrying audio information would suffice. In any event, the audio beep and resonant reed relay 134 responsive thereto could be replaced by a conductive area on the tape, such as silver or the like, adapted to bridge a pair of normally open contacts upon the completion of a message to energize a conventional relay coil to in turn close switch 136.

Further, it is pointed out that the apparatus herein can be employed to receive messages as well as send messages by merely substituting a recording unit for playback unit 24 and positioning it proximate to the receiving end of handset 14.

From the foregoing it should be appreciated that a system and apparatus has been provided for automatically successively dialing a plurality of telephone numbers and delivering a prerecorded message to each number so dialed. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the true scope of the invention as claimed.

The following is claimed:

1. Apparatus for successively rotating the rotatable dial of a telephone to positions respectively determined by a series of coded digits stored in a memory device comprising:
- a shaft;
- finger means extending from said shaft and inserted into a hole in said dial for coupling said shaft to said dial;
- a control circuit including first and second sets of switches;
- read means associated with said memory device for controlling the orientation of said first set of switches in accordance with said stored digits;
- coded means carried by said shaft operatively coupled to said second set of switches for controlling the orientation of said second set of switches in accordance with the rotational position of said shaft;
- rotating means operatively engageable with said shaft for rotating said shaft; and
- means responsive to a predetermined orientation relationship between said first and second sets of switches for disengaging said rotating means from said shaft.

2. The apparatus of claim 1 wherein said memory device defines a plurality of distinct positions each containing first coded digit information, and
- said coded means defines a plurality of distinct radial positions each containing a unique digit represented by second coded digit information corresponding in code to said first coded digit information.

3. The apparatus of claim 1 wherein said memory device comprises a paper tape defining a plurality of longitudinal tracks and a plurality of distinct vertical positions, each of said vertical positions containing first coded digit information in the form of unique combinations of apertures in said tracks,
- said coded means defining a plurality of distinct radial positions each containing a unique digit represented by second coded digit information corresponding in code to said first coded digit information.

4. The apparatus of claim 1 wherein said memory device defines a plurality of distinct positions each containing first coded digit information, and
- said coded means comprises a plate carried by said shaft in fixed relationship with respect to said dial, said plate defining a plurality of annular tracks and a plurality of distinct radial positions each containing a unique digit represented by second coded digit information in the form of unique combinations of apertures in said tracks, said first and second coded digit information corresponding to each other in code.

5. The apparatus of claim 1 wherein said memory device comprises a paper tape defining a plurality of longitudinal tracks and a plurality of distinct vertical positions, each of said vertical positions containing first coded digit information in the form of unique combinations of apertures in said tracks, and said coded means comprises a plate carried by said shaft in fixed relationship with respect to said dial, said plate defining a plurality of annular tracks and a plurality of distinct radial positions containing a unique digit represented by second coded digit information in the form of unique combinations of apertures in said tracks, said first and second coded digit information corresponding to each other in code.

6. The apparatus of claim 5 comprising fixedly mounted means disposed adjacent said plate for reading said second coded digit information thereon to thereby determine the rotational position of said plate and said dial.

7. The apparatus of claim 6 wherein said fixedly mounted means comprises a light source disposed adjacent said plate on one side thereof, and a plurality of photocells disposed in radial alignment adjacent said plate on the other side thereof, each of said photocells being associated with an individual one of said annular tracks.

No references cited.

KATHLEEN H. CLAFFY, *Primary Examiner.*

J. W. JOHNSON, *Assistant Examiner.*